United States Patent [19]

Sarson et al.

[11] 4,133,564

[45] Jan. 9, 1979

[54] QUICK CONNECT TUBE COUPLING

[75] Inventors: Charles R. Sarson, Euclid, Ohio; Frederick S. Browne, Farmington Hills, Mich.

[73] Assignee: Dana Corporation, Toledo, Ohio

[21] Appl. No.: 754,567

[22] Filed: Dec. 27, 1976

[51] Int. Cl.² .............................................. F16L 37/08
[52] U.S. Cl. ..................................... 285/321; 285/356
[58] Field of Search ............... 285/321, 347, 356, 388, 285/387, DIG. 22, 233, 234

[56] References Cited

U.S. PATENT DOCUMENTS

| 609,030 | 8/1898 | Keller | 285/387 X |
|---|---|---|---|
| 2,226,826 | 12/1940 | Miller | 285/321 X |
| 2,630,338 | 3/1953 | Snyder | 285/347 X |
| 2,914,344 | 11/1959 | Anthes | 285/347 X |
| 3,584,902 | 6/1971 | Vyse | 285/305 |
| 3,596,934 | 8/1971 | DeCenzo | 285/347 X |
| 3,773,360 | 11/1973 | Timbers | 285/321 X |
| 3,855,851 | 12/1974 | Paul, Sr. | 285/321 X |
| 3,871,691 | 3/1975 | Takagi et al. | 285/321 |
| 3,873,138 | 3/1975 | Griffiths et al. | 285/233 |

FOREIGN PATENT DOCUMENTS 1239532  4/1967  Fed. Rep. of Germany ........... 285/321

Primary Examiner—Thomas F. Callaghan
Attorney, Agent, or Firm—McNenny, Pearne, Gordon, Gail, Dickinson & Schiller

[57] ABSTRACT

A quick connect coupling is disclosed providing an integrally formed tube end assembly in which the wall of the tube is deformed to increase the diameter and is subsequently roll formed to produce a pair of axially spaced peripheral grooves to receive a snap lock ring and a seal. The inside diameter of the tube end within the grooves is substantially as large as the inside diameter of the remainder of the tube so that a substantial flow restriction does not result from the presence of the peripheral grooves. The material of the tube end is work hardened so that sufficient structural strength is provided even in the zone of the grooves. A smoothly curved rib is also formed in the tube wall to cooperate with a lock ring to permanently connect a tubular nut to the tube end after the device is initially connected as a quick connect coupling. The tubular nut is formed with a counterbore at its inner end to provide a radial wall and a cylindrical wall which receives the lock ring when the coupling is originally connected.

7 Claims, 6 Drawing Figures

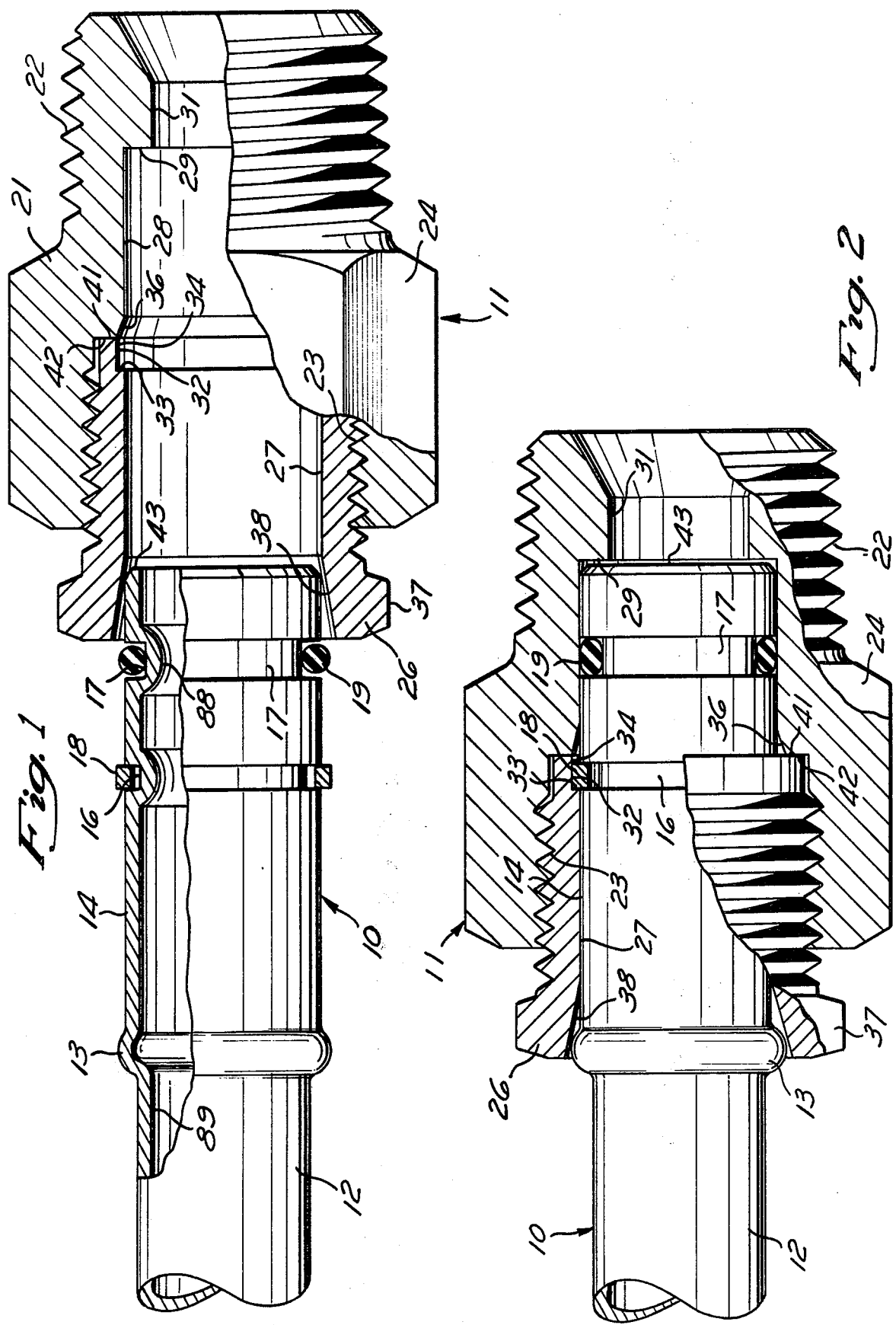

QUICK CONNECT TUBE COUPLING

BACKGROUND OF THE INVENTION

This invention relates generally to tube couplings and more particularly to a novel and improved quick connect tube coupling and to a novel and improved method of manufacturing such coupling.

PRIOR ART

Quick connect couplings allow initial assembly by merely inserting the tube end into the body assembly. Such couplings reduce installation labor costs, substantially eliminate the likelihood of cross threading and substantially eliminate the improper torquing of the parts. Such couplings usually provide a resilient seal and a snap lock system which allows the coupling to be initially assembled with threaded parts assembled as a pre-assembly operation.

In some prior art of quick connect couplings an adapter ring is mounted on the end of the tube to provide the structure for sealing and locking of the coupling. In such structures it is necessary to provide a fluid tight joint between the adapter ring and the coupling and to provide sufficient structural strength to withstand the various mechanical loads applied to the system. Examples of such structures are described in the U.S. Pat. Nos. 3,146,696 granted Apr. 18, 1967 and 3,540,760 granted Nov. 17, 1970. Similar structures are also provided in couplings which are not strictly considered quick connect couplings, examples of such couplings are described in the U.S. Pat. Nos. 2,521,127 granted Sept. 5, 1950 and 2,935,343 granted May 3, 1960.

Other quick connect couplings avoid the mounting of a separate adapter ring on the end of the tube but provide radial projections created by deforming the tube material itself. Such projections provide a base for the locking structure and/or the seal system. In many instances the forming of these projections involve rather drastic deformation of the tube material and leads to stress concentration zones and weakening of the basic tube structure. Examples of such couplings are described in the U.S. Pat. Nos. 2,441,344 granted May 11, 1948; 3,414,299 granted Dec. 3, 1968; 3,584,902 granted June 15, 1971; 3,847,421 granted Nov. 12, 1974 and 3,826,523 granted July 30, 1974.

Another type of quick connect structure is illustrated in the U.S. Pat. No. 3,381,983 granted May 7, 1968. Such patent describes a joint or coupling in which the pipe is formed, probably by casting, with a thickened end which is machined to provide the seal and locking structure.

SUMMARY OF THE INVENTION

There are several important aspects to the present invention. In accordance with one important aspect of this invention, a novel and improved quick connect locking system is provided in which a counterbore is formed in the nut to receive the lock ring when the coupling is assembled. Such counterbore is easier to accurately manufacture than an internal groove. The locking system also includes a rib or annular projection on the tube end which cooperates with the lock ring to permanently retain the nut on the tube end after the initial quick connect assembly of the coupling. These and other structural features cooperate to provide a simple low cost quick connect coupling that functions reliably and is easy to use. Such structural features are applicable not only to the illustrated embodiment but also to embodiments manufactured by other processes.

In accordance with other important aspects of this invention, a novel and improved quick connect coupling includes a tube end which does not require a separate coupling ring mounted on the end of the tube. Instead the tube end structure is integrally formed at the end of a piece of tubing. The tube end for the coupling does not require a thickened section and is not formed by machining. Instead the tube end is provided with its required shape by deforming the material of the end of the tube.

In the illustrated embodiment of the present invention the tube is provided with an enlarged end portion produced by pressing a mandrel into the tube. Subsequently, two peripheral grooves are formed in the enlarged section to receive the seal and the lock ring. Such grooves are formed by rolling operations which radially displace the tube material inward. The work hardening of the material provides a finished structure which is capable of withstanding pressure and mechanical loads which are in the same order of magnitude as the capacity of the tube prior to the deforming operation. The enlargement of the tube ends is arranged so that the zone of the tube end beneath the grooves has substantially the same diameter as the internal diameter of the tube so that substantially flow restrictions do not result.

In accordance with still another important aspect of this invention a novel and improved method is provided for forming an integral tube end on the end of a piece of metal tubing.

These and other aspects of this invention are more fully described in the following description and drawings.

BRIEF DESCRIPTION OF THE DRAWINGS

FIG. 1 is a side elevation partially in longitudinal section illustrating a preferred embodiment of this invention before the tube end assembly is inserted in the body assembly;

FIG. 2 is a side elevation similar to FIG. 1 but illustrating the coupling in the assembled condition;

DETAILED DESCRIPTION OF THE DRAWINGS

Figure 3:
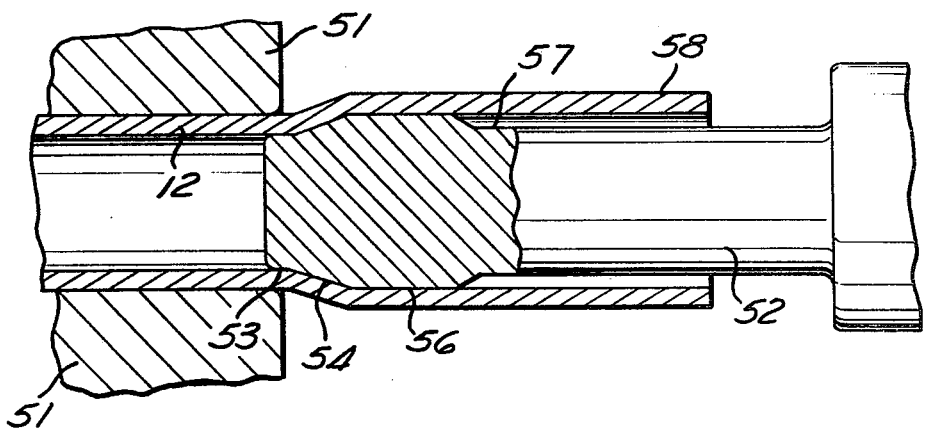
FIG. 3 is a side elevation illustrating the first forming operation for producing the tube end structure illustrated in FIGS. 1 and 2 wherein the end of the tube is enlarged by inserting a mandrel from the end of the tube.

Referring to the drawings the illustrated embodiment of this invention includes a tube end assembly 10 and a body assembly 11. The tube end assembly 10 is integrally formed on the end of a piece of tubing 12 preferably formed of work hardening material. The tubing 12 is deformed in a manner described in detail below to provide a smoothly curved annular rib or projection 13 and an end portion 14 having a diameter greater than the diameter of the tubing 12 and which extends from the rib 13 to the end of the tube end 10.

A pair of peripheral grooves 16 and 17 are formed at axially spaced locations on the end portion 14. The rearwardmost groove 16 is a lock ring groove and contains a compressible lock ring 18 of rectangular cross section. The lock ring 18 is formed with a circular shape and its ends are spaced so that it can be compressed to a smaller diameter to fit down in the groove 16. Positioned in the forwardmost groove 17 is an O-ring seal 19 which operates when the coupling is assembled to provide a fluid tight joint between the body assembly 11 and the tube end assembly 10.

The body assembly 11 includes a tubular body member 21 formed with an external thread 22 on its forward end and providing an internal thread 23 at its rearward end. Wrenching flats 24 on the body permit the body to be threaded into the associated system.

It should be understood that although the coupling is illustrated with a separate body member 21, it is within the scope of the present invention to provide the functioning parts of the body member 21 as an integral part of the associated equipment and in such an event the external threads 22 and wrenching flats 24 are not required.

Threaded into the threads 23 is a tubular nut 26 having a bore 27 co-axial with a tube receiving bore 28 formed in the body member 21. The two bores 27 and 28 are of equal diameter in the illustrated embodiment and are proportioned to receive the end portion 14 with a close fit. Forward of the bore 28 is a shoulder 29 which extends between the bore 28 and a bore 31.

The tubular nut 26 is formed with a counterbore 32 providing a radial wall 33 and a cylindrical surface 34 which cooperate to receive the lock ring 18 when the coupling is assembled. The counterbore cooperates with the adjacent surface of the body member to define a lock ring receiving internal groove. Forward of the counterbore 32 the body member 21 is formed with a conical camming surface 36 to compress the seal 19 as the seal moves out of the counterbore 32 into the bore 28 in the body member. Such conical surface prevents damage to the seal as the tube end is pressed into the assembled position.

Formed on the tubular nut 26 within the wrenching portion 37 is a camming ramp 38 having an open end formed with a diameter greater than the diameter of the seal 19 and the unstressed diameter of the compression ring 18. This camming ramp 38 like the conical surface 36 compresses the seal 19 as the tube end is pressed into its assembled position. However, such camming ramp also functions to compress the lock ring 18 into the groove 16 so that such lock ring can move along the bore 27 until it reaches the counterbore 32. The end of the tube nut 26 is provided with a radial face 41 which engages a shoulder 42 formed in the body member 21 when the tube nut is properly installed and torqued within the body member 21.

In use the body assembly 11 is installed in the associated equipment with the tube nut properly torqued into position or if the coupling is formed with the functioning parts of the body member 21 as an integral part of the associated equipment, the tube nut 26 is installed and torqued into place.

The tube end 10 is then installed by merely pressing the tube axially in along the body assembly until the assembled position of FIG. 2 is reached. At such time the coupling is assembled and is ready for use.

As the tube end 10 is pressed into the body assembly 11 the end of the tube is guided in along the camming ramp 28 and enters the bore 27. Continued movement toward the assembled position causes the O-ring seal 19 to be compressed inwardly so that it smoothly enters the bore 27 and thereafter the compressible ring 18 is compressed radially into the peripheral groove 16 and smoothly enters the bore 27.

When the assembly has progressed a sufficient amount to position the O-ring seal 19 within the counterbore 32 the O-ring expands back to its uncompressed diameter but is again compressed as it engages the conical surface 36 so that it smoothly passes into the bore 28.

The completion of the assembly occurs when the snap ring 18 reaches the counterbore 32 and snaps radially out against the cylindrical wall 34 so that it bridges between the radial face 33 and the groove 16 as illustrated in FIG. 2. In such condition the O-ring seal 19 is in sealing engagement with the surface of the bore 28 and provides a fluid tight joint between the tube end assembly 10 and the body member 21. In such position the lock ring prevents movement of the tube end to the left as viewed in FIG. 2 and functions to absorb the mechanical loads applied to the tube.

The various proportions are preferably arranged so that the end of the tube 43 is slightly spaced from the radial wall 29 and the rib 13 is slightly out of contact with the camming ramp 38 to insure that the tube end assembly 10 is free to move fully into the body assembly to allow the lock ring to expand into the locked assembled position. However, the clearance between the rib 13 and the camming surface 38 is sufficiently small so that the lock ring is permanently retained in the counterbore 32. Consequently, when the coupling is disassembled by removing the tubular nut 26 from the body member 21 the tubular nut 26 is permanently retained on the tube end and the coupling may be reassembled by again threading the tube nut 26 into the body member 21. With the illustrated structure the tube is free to rotate with respect to the body assembly. This allows the nut to be threaded into and out of the body member. Also, it allows rotation of the tube during or after assembly.

FIGS. 3 through 6 illustrate one preferred method of forming the end of the tube 12 to the shape illustrated in FIGS. 1 and 2. The first operation is schematically illustrated in FIG. 3 wherein the tubing 12 is gripped within gripping jaws 51 and is held against axial movement. A mandrel 52 is then pressed axially into the end of the tube. Such mandrel is formed with a pilot portion 53 having a diameter substantially equal to the inside diameter of the tubing 12, a conical ramp portion 54 which functions to expand the wall of the tubing and a land 56 having a diameter substantially equal to the required internal diameter of the enlarged portion 14 of the tube. Rearwardly of the land 56, the mandrel 52 is relieved, as illustrated at 57, to minimize the fictional forces on the tubing as the mandrel is pressed into the tube.

At the completion of the operation illustrated in FIG. 3, the end of the tubing 58 is expanded by the mandrel 52 to a diameter slightly larger than the diameter of the end portion 14 of the finished tube end. In the second forming operation illustrated in FIG. 4 the tubing 12 is again held in grippers 51 and a tubular sizing die 62 is pressed over the expanded end 58 to accurately size the tube end with the diameter required for the end portion 14.

The sizing die 62 is provided with a working land 63 which has a diameter arranged to produce the exact diameter of the end portion 14 of the tube. With this method of first over expanding the tubing slightly and then reducing the diameter with an external sizing die, accurate sizing of the tube end is achieved when the tube end is formed on tubing having slightly different wall thicknesses within the tolerance range of such tubing.

Figure 4:
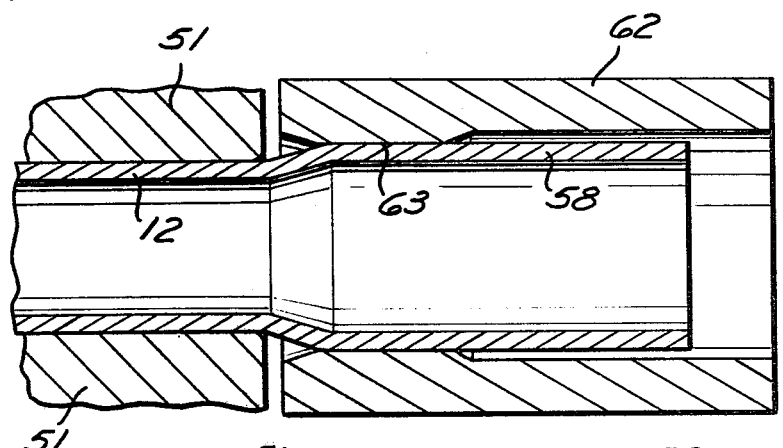
FIG. 4 is a view similar to FIG. 3 but illustrating the second operation of forming the tube end wherein the enlarged portion is sized by a sizing die.
Figure 5:
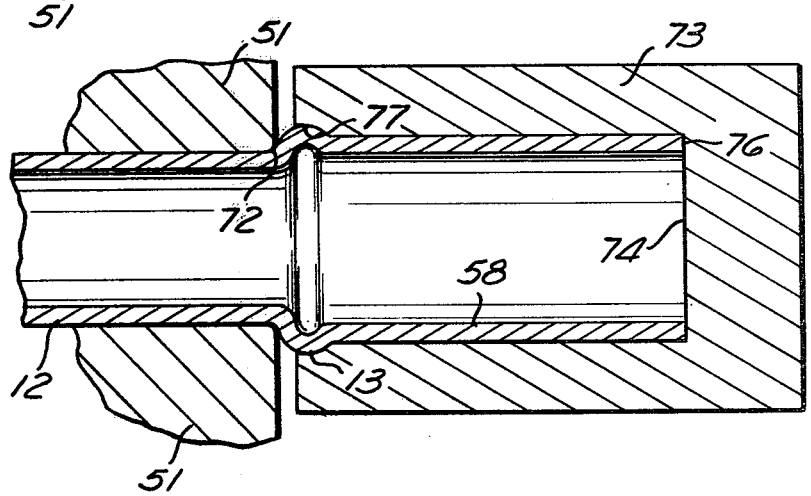
FIG. 5 is a view similar to FIGS. 3 and 4 but illustrating the third forming operation in which an enlarged rib is formed on the tube which subsequently functions in cooperation with the snap ring to lock the tubular nut on the end of the tube; and, FIG. 6 is a perspective view of the rolling operation utilized to form the annular peripheral grooves in the tube end for the lock ring and the seal.
Figure 6:
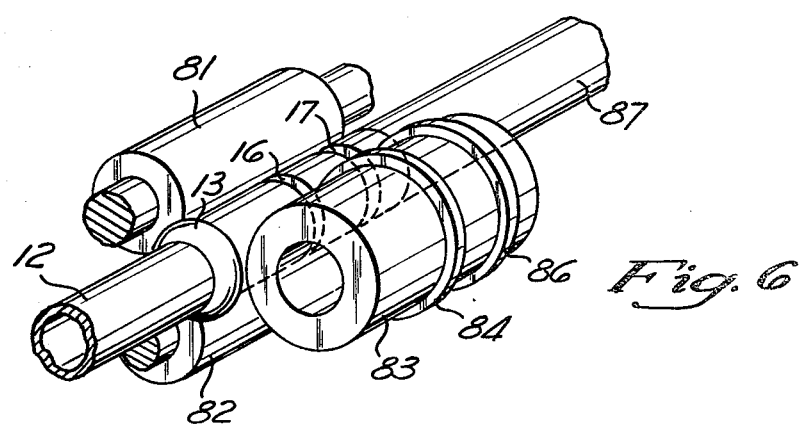

After the sizing operation of FIG. 4 the end of the tubing is deformed to produce the rib 13 as illustrated in FIG. 5. Here, again, the tubing 12 is clamped in gripping jaws 51 which are positioned immediately adjacent to the end of the undeformed portion of the tubing. The gripping jaws 51 are radiused at 72 so that a radius is formed adjacent the rib 13. The enlarged portion of the tube 58 is enclosed within a die 73 which closely fits the exterior of the enlarged portion 58 and is provided with an end wall 74 which engages the end 76 of the tube. After the end 76 bottoms out on the end wall 74, continued movement of the die 73 causes the rib 13 to be formed in the wall of the tube within a flared section 77 formed in the forward end of the die 73 and shaped to match the profile required for the rib 13.

After the rib is formed the two grooves 16 and 17 are rolled into the enlarged end portion 58. This rolling operation is preferably performed by a system schematically illustrated in FIG. 6 in which the enlarged end 58 is positioned between two back up rolls 81 and 82 and a groove forming roll 83. The two back up rolls 81 and 82 are cylindrical in shape and are journaled for rotation about their respective axes. The groove forming roll 83 is also cylindrical in shape and is, in the illustrated embodiment, provided with a larger diameter than the diameter of the back up rolls 81 and 82.

Formed on the outer surface of the row 83 are a pair of groove forming ribs 84 and 86 which are sized to provide the same profile and shape as the corresponding grooves 16 and 17 respectively. The roll 83 is mounted for radial movement with respect to the axis of the tube 12 and as relative rotation is produced between the three rolls and the tube 12 the roll 83 is moved radially in to deform the wall of the portion 58 to form the groove 16 and 17 of the finished end portion 14. During such rolling operations there is a tendency for ridges to be formed on both sides of each groove but such ridges are pushed back and rolled out by the back up rolls 81 and 82 so that the corners of the grooves at their outer edges are properly and sharply filled. Preferably the roll 83 is formed with radii at the edges of the ribs 84 and 86 and the roll 83 is moved inwardly until it actually bottoms out on the cylindrical portions on either side of the groove. This insures that the grooves are fully and accurately formed. During rolling, the end of the portions 58 is supported against axial elongation by a support member 87 and the tubing 12 is gripped by means not illustrated so that the length of the portion 58 does not increase during the rolling operation. Preferably, the enlarged portion 58 is formed with a length slightly greater than the required length for the end portion 14 and the end of the tube is cut off and finished after the rolling operation of FIG. 6.

The tube end is formed so that the inside diameter within the grooves is substantially equal to the inside diameter of the tube 12. In the preferred embodiment illustrated the inside diameter at 88 underneath the groove 17 and under groove 16 is slightly smaller than the inside diameter 89 of the initial tubing 12. However, the reduction in diameter resulting from the groove rolling operation is not substantial because the end portion 14 is enlarged and has an inside diameter greater than the diameter 89. Consequently, the finished coupling does not provide substantial reduction of the tubing diameter and does not provide any significant restriction to flow through the coupling.

In the illustrated structure the wall thickness of the end portion is substantially uniform and is substantially equal to the original wall thickness of the tube 12. The groove 16 is of lesser axial extent than the groove 17. It is recognized that slight thinning occurs adjacent the grooves 16 and 17. The thinning of the wall of the end portion is compensated for to a considerable extent by the work hardening resulting from the forming operations. Therefore, the finished end portion is sufficiently strong to withstand substantially the same pressures as the unworked tubing 12. Similarly, the rib 13 is formed with a smoothly curved profile so that zones of stress concentration are minimized. The entire tube end structure in accordance with the preferred embodiment of this invention is capable of withstanding the mechanical loads and pressure loads normally encountered.

In the illustrated embodiment the depth of the groove 16 is at least as great as the radial thickness of the lock ring 18 and the lock ring in its unstressed condition has an outside diameter substantially equal to the diameter of the counterbore 32 so that after assembly it will snap out against the cylindrical surface 32. Further, the radius of the counterbore 32 is greater than the radius of the end portion 14 by approximately one-half of the radial thickness of the lock ring to insure that the lock ring properly bridges between the two grooves when the coupling is assembled.

Although a preferred embodiment of this invention is illustrated it is to be understood that various modifications and rearrangements may be resorted to without departing from the scope of the invention disclosed and claimed.

We claim:

1. A quick connect coupling providing a body assembly having a tube end rceiving passage with a seal portion and a radially extending wall for positioning a lock ring, and a tube formed with an integral end portion having a substantially uniform wall thickness substantially equal to the wall thickness of the remainder of said tube, said end portion providing a substantially cylindrical wall having an inside diameter greater than the diameter of said remainder of said tube and a peripheral groove, the wall of said end portion at said groove extending inwardly and around said groove to maintain said substantially uniform thickness, the inside diameter of said end portion around said groove being at least substantially as large as the inside diameter of said remainder of said tube, a snap lock ring bridging between said groove and said radially extending wall operating to lock said end portion in said passage when said end portion is assembled in said passage, seal means separate from said lock ring providing a fluid tight joint between said end portion and body assembly, said body assembly including a body member and a nut threaded to said body member, said radially extending wall being formed on said nut substantially adjacent the inner end thereof, said nut having a counterbore at its inner end, said radially extending wall being provided by the inner end of said counterbore, and said nut being threaded to said body member until the inner end of said nut bottoms on said body member.

2. A quick connect coupling as set forth in claim 1 wherein said tube is formed of work hardening material, and the material forming said end portion is work hardened more than said remainder of said tube.

3. A quick connect coupling as set forth in claim 2 wherein said end portion is provided with a second peripheral groove, and said seal means is a resilient seal positioned in said second peripheral groove.

4. A quick connect coupling as set forth in claim 3 wherein said end portion is formed with a rib operable in cooperation with said lock ring to permanently position said nut on said end portion after said end portion is positioned in said passage.

5. A quick connect coupling comprising a body assembly and a tube end assembly, said body assembly including a body member providing a tube end receiving passage and a tubular nut threadedly connected to said body assembly in alignment with said passage, said nut being formed with a counterbore at its inner end providing a substantially radial end face wall; said tube end assembly providing a tube end portion formed with a pair of axially spaced peripheral grooves, said tube end portion having an internal diameter larger than the diameter of the remainder of the tube, the inside diameter of said tube end portion radially inwardly of said grooves being substantially as large as the inside diameter of said remainder of the tube to minimize flow restriction through said tube end portion, a seal in the forward of said peripheral grooves, a compressible lock ring in the rearward of said peripheral grooves, said tube end portion being proportioned to fit through said nut into said passage providing a close fit with both, a camming ramp on said nut operable to compress said lock ring into said rearward groove as its moves toward said radial end face, said tube end assembly being axially movable into said body assembly to an installed position with said seal in said passage providing a seal between said assemblies and said lock ring bridging between said rearward peripheral groove and said radial end face to prevent separation of said assemblies.

6. A quick connect coupling as set forth in claim 5 wherein said tube end portion is formed with a radially extending rib operable in cooperation with said lock ring to permanently position said nut on said tube end portion after said tube end portion is positioned in said passage.

7. A quick connect coupling providing a body assembly having a tube end receiving passage with a seal portion and a radially extending wall for positioning a lock ring, and a tube formed with an integral end portion having a substantially uniform wall thickness substantially equal to the wall thickness of the remainder of said tube, said end portion providing an substantially cylindrical wall having an inside diameter greater than the diameter of said remainder of said tube and a peripheral groove, the wall of said end portion at said groove extending inwardly and around said groove to maintain said substantially uniform thickness, the inside diameter of said end portion around said groove being at least substantially as large as the inside diameter of said remainder of said tube, a snap lock ring bridging between said groove and said radially extending wall operating to lock said end portion in said passage when said end portion is assembled in said passage, seal means separate from said lock ring providing a fluid tight joint between said end portion and body assembly, said tube being formed of work-hardening material, the material forming said end portion being work-hardened more than said remainder of said tube, said end portion having a second peripheral groove, said seal means being a resilient seal positioned in said second peripheral groove, said body assembly including a body member and a nut threaded to said body member, said radially extending wall being formed on said nut substantially adjacent the inner end thereof, said nut being formed with a counterbore at its inner end, said radially extending wall being provided by the inner end of said counterbore, and said nut being threaded to said body member until the inner end of said nut bottoms on said body member.

* * * * *